Aug. 24, 1937.  W. HOIER  2,091,000
INTERNAL MILLING MACHINE
Filed March 26, 1936    3 Sheets-Sheet 1
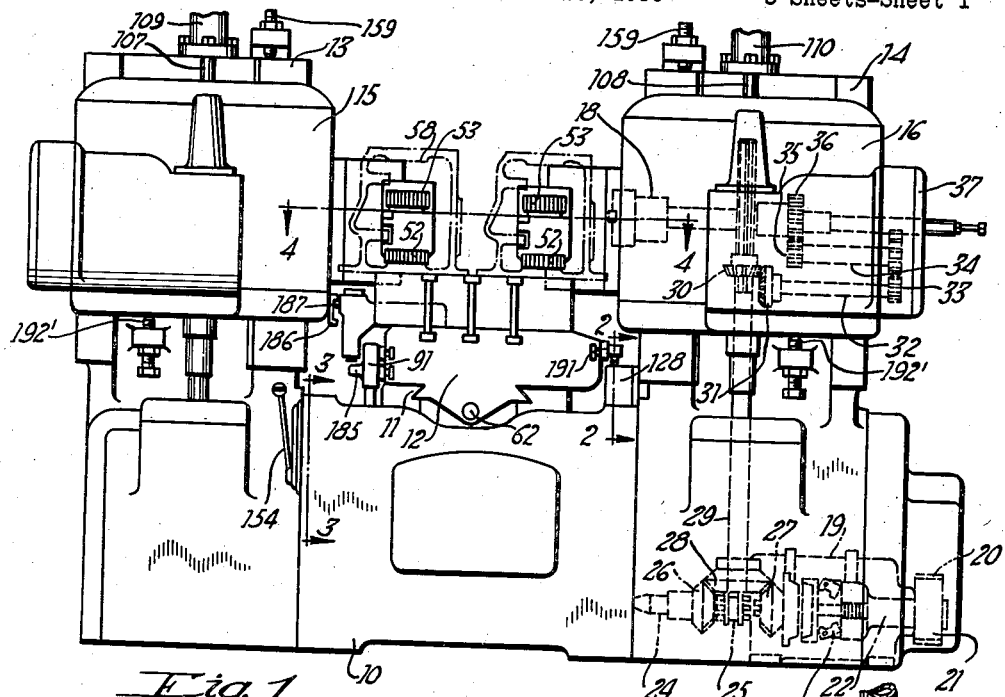
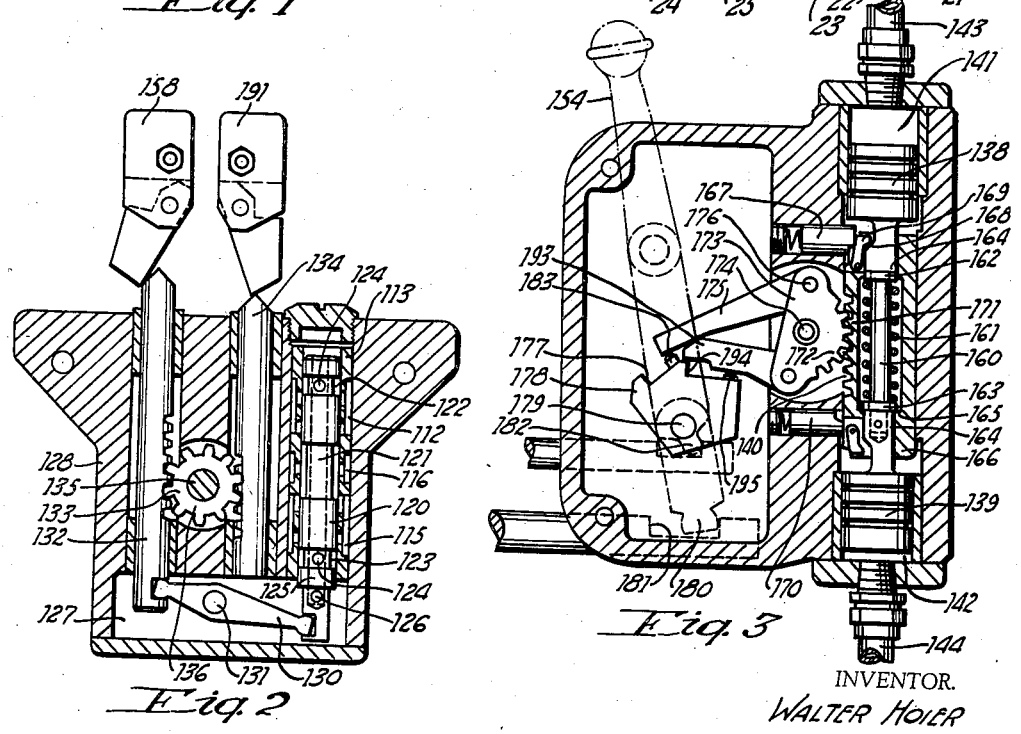
INVENTOR.
WALTER HOIER
BY
A. H. K. Parsons
ATTORNEY

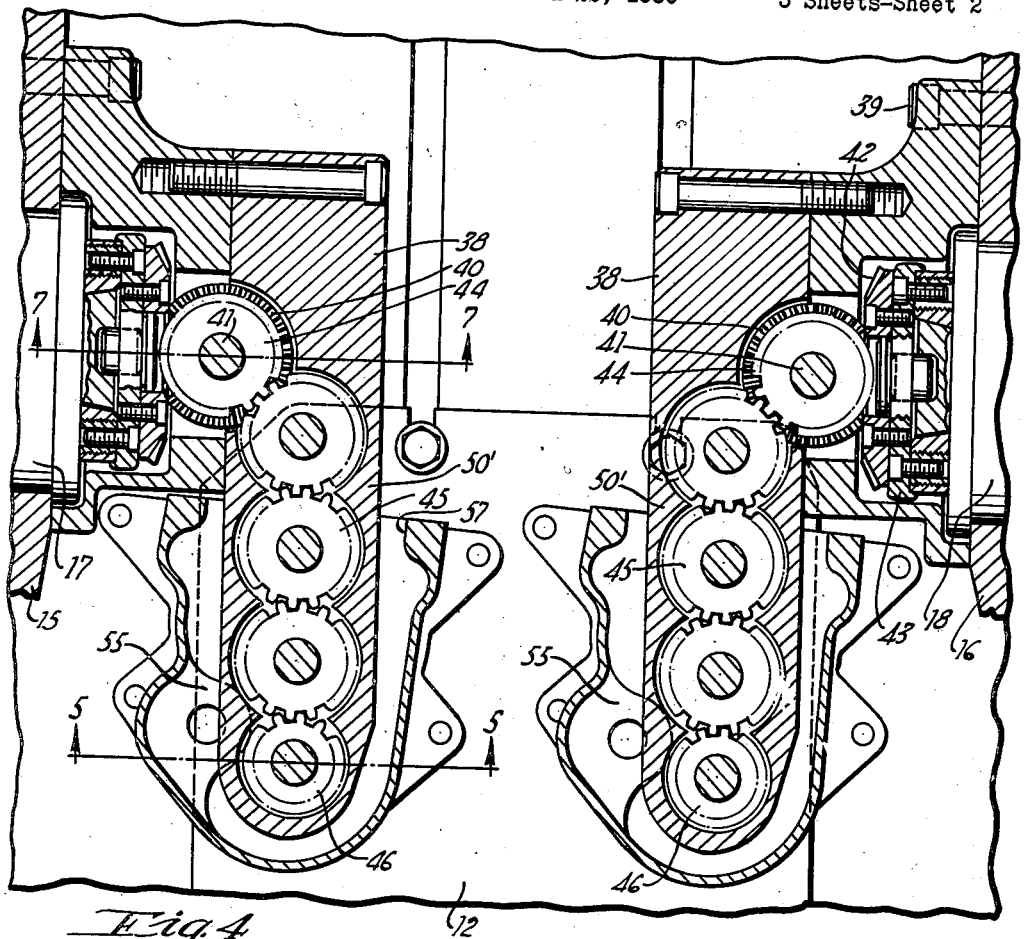
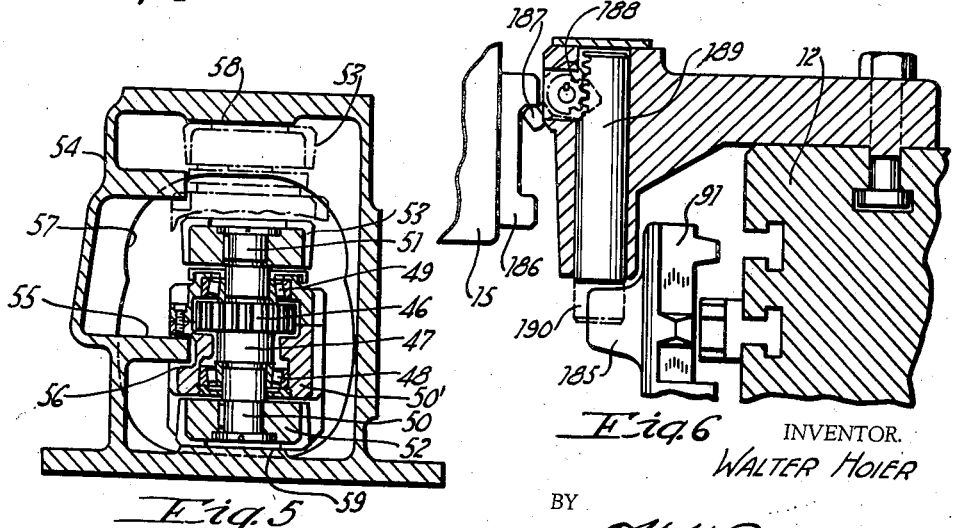

Aug. 24, 1937.    W. HOIER    2,091,000
INTERNAL MILLING MACHINE
Filed March 26, 1936    3 Sheets-Sheet 3
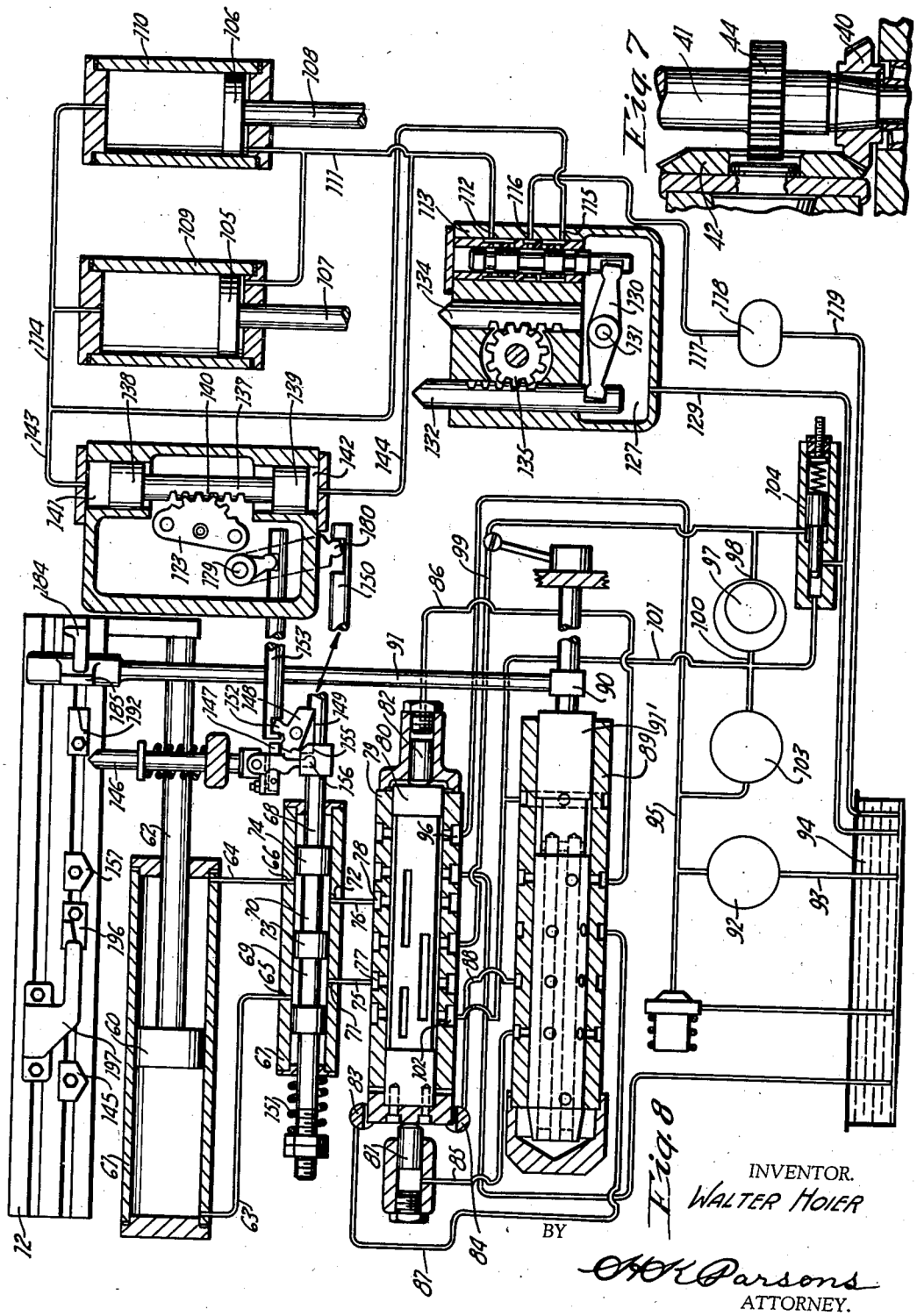
INVENTOR.
WALTER HOIER
BY
OHK Parsons
ATTORNEY.

Patented Aug. 24, 1937

2,091,000

UNITED STATES PATENT OFFICE 2,091,000

INTERNAL MILLING MACHINE

Walter Hoier, Cincinnati, Ohio, assignor to The Cincinnati Milling Machine Co., Cincinnati, Ohio, a corporation of Ohio Application March 26, 1936, Serial No. 70,989

13 Claims. (Cl. 90—16)

This invention relates to milling machines and more particularly to an improved form of internal milling machine.

One of the objects of this invention is to provide a machine which will automatically mill a plurality of internal surfaces on a work piece, some of which are normally inaccessible, by straight line movement between the tool and work.

Another object of this invention is to provide a machine for milling internal surfaces on a plurality of work pieces simultaneously.

Another object of this invention is to provide an improved cycle of operation for a milling machine whereby spaced surfaces lying in different planes may be automatically finished in one continuous cycle of the machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 2 is an enlarged detail section taken on the line 2—2 of Figure 1.

Figure 3 is an enlarged detail section taken on the line 3—3 of Figure 1.

Figure 4 is a horizontal sectional view through the milling heads as viewed on the line 4—4 of Figure 1.

Figure 5 is a detail section taken on the line 5—5 of Figure 4.

Figure 6 is a detail view of a removable trip member.

Figure 7 is a detail section on the line 7—7 of Figure 4.

Figure 8 is a diagram of the hydraulic control circuit.

In Figure 1 of the drawings the reference numeral 10 indicates the base of a milling machine upon which is formed horizontally extending guide ways 11 for receiving and supporting a reciprocable work table 12.

Uprising at opposite sides of the bed are columns 13 and 14 having vertically movable spindle carriers 15 and 16 supported respectively thereon. The carrier 15 has a cutter spindle 17 journaled therein and the carrier 16 has a cutter spindle 18 journaled therein. These cutter spindles are driven from a common prime mover 19 located in the bed of the machine which is operatively connected through a chain 20 and pulley 21 to a drive shaft 22. This drive shaft is adapted to be connected through a suitable friction disc clutch 23 for rotation of shaft 24. This shaft extends crosswise of the bed and drives branch transmissions to each of the spindles.

Since these branch transmissions are identical it is only believed necessary to describe one of them. The transmission to spindle 18 is connectible to shaft 24 by a shiftable reversing clutch 25 having teeth on opposite sides thereof for alternately engaging bevel gears 26 and 27. These gears interengage with a common bevel gear 28 secured to the lower end of shaft 29. The shaft 29 extends vertically into the carrier in splined relation to a bevel gear 30 which is held in the carrier against axial movement. The bevel gear 30 drives through bevel gear 31 and shaft 32 a pair of change gears 33. The driven member of this pair of gears is connected to shaft 34 which also has a spur gear 35 keyed thereto in driving relation to spur gear 36 keyed to the spindle 18. By removing the cover plate 37 the change gears may be reversed in position, or new ones substituted whereby various rates of rotation of spindle 18 may be obtained.

A similar transmission and reversing mechanism is provided for spindle 17 and therefore each of these spindles may be simultaneously rotated at variable rates. For the purposes of internal milling each carrier has an internal milling attachment secured thereto and since the spindles oppose one another these attachments must be built to opposite hand, although the mechanism contained therein is the same.

The internal milling attachment 38, as shown in Figure 4, is secured to the carrier 16 as by bolts 39 and in such relation that a bevel gear 40 keyed to shaft 41 and carried by the bracket intermeshes with a bevel gear 42 which is secured to the end of the spindle nose by an adapter plate 43. The shaft 41 has a spur gear 44 fixed therewith which drives through a gear train 45 a final gear 46, which, as shown in Figure 5, is keyed to a shaft 47. This shaft is journaled in anti-friction bearings 48 and 49 in the end of an arm 50', which projects from the internal milling fixture and which arm is of sufficient length to reach into the work piece to be machined.

The shaft 47 has reduced ends 50 and 51 upon which are keyed the milling cutters 52 and 53. Since the work piece 54 has an internal rib 55, which would normally interfere with insertion of the arm of the fixture, the side of the arm is relieved or cut away at 56 so as to prevent such interference.

Briefly, the cycle of operation of the machine is as follows:

Relative movement between the internal milling head and the table is effected, the parts being so positioned vertically that the cutters 52 and 53 will pass through the opening 57 in the end of the work. Relative longitudinal movement is then stopped and a relative vertical movement effected to position the cutter 53 in the correct vertical plane to mill the upper internal boss 58. When this operation is completed, a retractive longitudinal relative movement is effected between the parts to such a position that the end of the head will clear the internal rib 55 and then a relative vertical movement is effected to position the face of cutter 52 in the plane of the finished surface to be formed on the lower internal boss 59. A relative longitudinal feeding movement is then effected to finish the boss 59, after which the direction of movement is reversed and the milling heads withdrawn from the work, in which position they remain until new work pieces are secured to the table.

The mechanism for effecting this cycle will be more clearly understood by referring to the hydraulic diagram shown in Figure 8. In this view the piston 60, which is slidably mounted in the cylinder 61, is connected by the piston rod 62 for moving the table 12 and in a direction depending upon into which end of the cylinder 61 fluid pressure is introduced.

Fluid is delivered to opposite ends of cylinder 61 through pipes 63 and 64, which terminate in ports 65 and 66 respectively of a stop valve 67. The valve plunger 68 of this valve has a pair of annular grooves 69 and 70 which serve to interconnect ports 71 and 72 to ports 65 and 66 respectively when the plunger is in a running position, as shown in Figure 8, and a pair of spools 73 and 74 which are adapted to close ports 71 and 72 when the plunger is moved leftward to a stop position.

The ports 71 and 72 are connected by channels 75 and 76 to ports 77 and 78 of a rate and direction selector valve 79. This valve has a plunger 80 which is shifted longitudinally by hydraulically actuated plungers 81 and 82 to change direction and is rotated by hydraulically actuated plungers 83 and 84 to change the rate from feed to rapid traverse or reverse. All of these plungers are connected in the order named by channels 85, 86, 87 and 88 respectively to a pilot valve 89. This pilot valve is operatively connected at 90 to a trip plunger 91, which may be rotated to shift the pilot valve plunger 91′ longitudinally for effecting direction changes; and moved axially to cause rotation of plunger 91 and thereby effect rate changes.

Fluid pressure is supplied to the system by means of a rapid traverse pump 92 which has an intake 93 through which fluid is withdrawn from the reservoir 94, and a delivery channel 95 by means of which the pump is connected to port 96 of the selector valve 79. A feed pump 97 is also provided having an intake 98 to which fluid is returned from the low pressure end of the cylinder through channel 99 and a delivery port 100 which is connected by channel 101 to port 102 of the selector valve. The feed pump 97 is a metering pump, and in operation withdraws fluid from one end of the cylinder and pumps it into the other end thereof. Due to piston differential, however, a booster pump 103 is provided for supplying deficiencies in the one case, and a differential relief valve 104 is provided for bypassing excess fluid in the second case.

This hydraulic circuit is the same as that shown in Patent 1,998,003, issued to Hans Ernst et al., April 16, 1935. A further description thereof is not believed to be necessary.

The carriers 15 and 16 may be moved up and down by pistons 105 and 106 which are connected to the respective carriers by piston rods 107 and 108. Pistons 105 and 106 are contained in cylinders 109 and 110 respectively, and one end of these cylinders is connected to a common line 111 terminating in port 112 of a reversing valve 113. The other end of these cylinders is connected to a common line 114 which terminates in port 115 of the reversing valve. The reversing valve has a pressure port 116 which is connected by channel 117 to a pump 118, having an intake 119 through which fluid is withdrawn from the reservoir 94.

The reversing valve has a plunger 120, Figure 2, in which is formed an annular groove 121 for selectively connecting the pressure port 116 to ports 112, 115; and a pair of annular grooves 122 and 123 which are adapted to register respectively with one of ports 112, 115 when the other thereof is connected to the pressure port. The annular grooves 122 and 123 have radial holes 124 drilled therein, which intersect a longitudinal bore 125 which extends through the center of the plunger and terminates in a cross bore 126 located in the lower end thereof and which is always in communication with the chamber 127 formed in the bottom of the bracket 128. This chamber is connected by a channel 129 to reservoir 94 for returning exhaust fluid thereto.

The reversing valve plunger 120 is connected by a lever 130 fulcrumed at 131 to a trip plunger 132 slidably mounted in the bracket 128 and connected by rack and pinion means 133 to a second plunger 134 whereby when plunger 132 is moving in one direction, the plunger 134 will move in an opposite direction. The shaft 135, which supports the pinion 136 may also have connected to it, suitable load and fire detent mechanism, not shown, to insure operation of the reversing valve. Since such mechanisms are well-known and form no part of the present invention, it is not shown.

For the purpose of effecting automatic operation of the stop valve 67 at certain points in the cycle of the machine, there is provided an hydraulically actuated member 137 having pistons 138 and 139 formed on opposite ends thereof, and a rack portion 140 formed intermediate the ends thereof. These pistons slide in cylinders 141 and 142 respectively which are connected by branch lines 143 and 144 to channels 114 and 111 respectively.

At the end of a given cycle the table 12 is moving toward the right, as viewed in Figure 8, and this movement will continue until the stop dog 145 depresses the stop plunger 146. A latch finger 147 carried on the lower end of plunger 146 rotates the pawl 148 in a counterclockwise direction, thereby withdrawing the same from the groove 149 formed in the stop plunger rod 150. A spring 151 is then free to shift the stop plunger 74 to the left and stop the table. At the same time, a lug 152 moves a connecting rod 153 to the left and thereby moves the start and stop control lever 154 into its right hand position.

After the finished work has been replaced by unfinished work pieces the operator throws the lever 154 toward the left into the position in which it is shown in Figures 3 and 8, which pulls the rod 150 toward the right and moves the stop valve plunger into the position shown in Figure 8. At the same time the rod 153 is actuated to rotate the latch pawl 148 in a clockwise direction to re-engage the slot 149 and hold the plunger 74 in a running position. This can be effected in spite of the fact that the plunger 146 is being held downward by the stop dog 145, due to the fact that when the machine is stopped a lug 155 carried by the rod 150 engages the end of a lever 156 and rotates the finger 147 out of engagement with the top of the pawl 148.

Therefore, the pawl is free to be rotated in a clockwise direction to relatch the stop valve in a running position, even though the stop plunger is depressed. When, however, the table 12 has moved a sufficient distance to permit the plunger 146 to rise, the lever 156 will swing counterclockwise to position the finger 147 over the top of the pawl 148.

The table now moves at a rapid traverse rate toward the left, as viewed in Figure 8, which continues until the milling heads are inserted in the work. Simultaneously, a second stop dog 157 depresses the stop plunger 146 to stop the table, and dog 158, Figure 2, depresses plunger 132, and thereby shifts the carrier control valve plunger 120 into a position to connect fluid pressure to the lower end of cylinders 109 and 110. This will cause the spindle carriers to rise until they engage positive stops 159 which will then cause pressure to build up in channel 111. This rise in pressure will be communicated through branch line 144 to cylinder 142. Attention is invited to the fact that the channel 144 is relatively small in diameter as compared to channel 111, whereby a pressure drop will be created between channel 111 and cylinder 142. For this reason, and the additional fact that the carriers are free to move, it is possible to raise the carriers first before plunger 137 is shifted.

The rise in pressure shifts the piston 139 and thereby the piston rod 160 which is surrounded by a spring 161, Figure 3. The spring is contained between a pair of washers 162 and 163 which are slidable relative to the rod 160, but which abut shoulders 164 on the piston rod and 165 on the shifter 166. When the rod 160 moves upward, the washer 162 and shifter 166 remain stationary, while the washer 163 abutting the shoulder 164 moves with the rod 160 to compress spring 161.

The shifter 166 is held against movement by a spring pressed pin 167 which engages one end of the shifter, but as the rod 160 moves up, a cam surface 168 moves a pawl 169 in a counterclockwise direction to force the plunger 167 to retract. When this plunger has retracted sufficiently to clear the end of the shifter 166, the latter is fired due to the compression of spring 161 and a second plunger 170 engages the lower end of the shifter to hold it in its new position.

The shifter, by means of rack teeth 171 formed longitudinally thereof intermeshing with gear teeth 172, rotates the member 173 about a fixed pivot 174 and causes an arm 175 pivotally connected at 176 to the member 173 to engage a shoulder 177 formed on a member 178, which is fixed with the shaft 179 that carries the lever 154. As the member 173 is rotated counterclockwise, the member 178 is also rotated counterclockwise, and thereby, through a ball-ended lever 180 engaging a slot 181 formed in the rod 150, shifts the stop valve to a running position.

The shaft 179 also has a lug 182 which pulls the rod 153 toward the right to insure engagement of the latch pawl 148 to hold the stop valve in its running position. Attention is invited to the fact that just at the end of the stroke of arm 175, a spring pressed plunger 183 acts upward in a direction to cause the end of arm 175 to disengage the shoulder 177, whereby the member 178 may be subsequently rotated in a clockwise direction without interference with the end of arm 175.

Since the selector valve was left in a rapid traverse position at the time that the table was stopped, it will be apparent that upon automatic repositioning of the stop valve to a running position that the table will again start at a rapid traverse rate and in the same direction. Therefore, a dog 192 on the table engages a lug on plunger 91 to raise the same and rotate the pilot valve 91' to change the rate to feed. This movement will continue until the cutter 53 has finished the upper boss 58, shown in Figure 5. A reversing dog 184, carried by the table, now engages the wing 185 on the trip plunger 91 and rotates the same to longitudinally shift the pilot valve plunger 91' and cause power shifting of the selector valve to cause return movement of the table at a rapid traverse rate.

When the carriers 15 and 16 were elevated to their present cutting position, a trip member 186, shown attached to the carrier 15 in Figure 6, engaged a ball-ended lever 187 and thereby, through a pinion and rack connection 188, moved dog 189 downward to a position indicated by the dash and dot lines 190 and thereby in the path of the wing 185 on the trip plunger 91. As the table returns at a rapid traverse rate, the disappearing dog 189 engages the wing 185 and rotates the trip plunger 91 to reposition the selector valve to cause feeding movement in the opposite direction. At the same time, however, the stop dog 157 depresses plunger 146 and causes automatic shifting of the stop valve plunger to a stop position.

Also, since the table is moving toward the right, as viewed in Figure 8, the dog 191, which is also moving toward the right, as viewed in Figure 2, depresses the plunger 134 and thereby, through the rack and pinion connections, etc., shown in Figure 2, shifts the control valve plunger 120 to cause downward movement of the carriers. When this downward movement is completed, by abutting positive stops 192', pressure will build up in cylinder 141 and cause actuation of piston 138, which will fire the shifter 166 and thereby rotate the member 173 in a clockwise direction. This time a second lever arm 193 will engage a second shoulder 194 formed on the member 178 and again rotate the member 178 in a counterclockwise direction to reposition the stop valve in a running position.

Near the end of the stroke of arm 193, a spring pressed plunger 195 will cause disengagement of arm 193 with shoulder 194 so that again the member 178 may be rotated without interference. Since the carriers are now down and the feeding movement again started, the cutter 52 will finish the lower boss 59, and at the end of the cutting operation the reverse dog 184 will rotate the trip plunger and cause return movement of the table at a rapid traverse rate.

The stop dog 157 will again operate to stop the table on its return movement and the lever 154 will have to be manually operated to initiate movement of the table in the same direction to its loading position. This time the dog 158 which will be traveling toward the right, as viewed in Figure 2, will pass over the plunger 132 without actuating the same, since it is a latch dog which is not effective for this direction of table movement.

Upon completion of the return movement of the table to a loading position, a trip dog 196 depresses the trip plunger 91 and rotates the pilot valve to cause power rotation of the selector valve from a rapid traverse position to a feeding position. This is to condition the parts so that immediately afterward when the reverse dog 197 rotates the trip plunger, it will position the parts for a rapid traverse forward movement. At the same time that the reversing dog 197 rotates the trip plunger 91, the stop dog 145 will depress the stop plunger 146 and stop movement of the table. The operator may now remove the finished work pieces and replace them with unfinished work pieces.

There has thus been provided an improved automatic machine for milling spaced surfaces on a work piece, which are normally inaccessible for a continuous straight milling operation.

What is claimed is:

1. In a machine for milling spaced internal bosses on a work piece, the combination of a tool carrying arm, co-axial cutters rotatably supported at the end of said arm, power operable means to effect relative reciprocation between the work support and said arm in one plane, power operable means to effect a relative displacement laterally of said plane between the work support and arm, to position the other of said cutters in a plane for milling a second boss on the work piece.

2. In an internal milling machine having a cutter head and a work table adapted to support a work piece having an internal opening therein, the combination of transmission means for effecting relative movement between the parts to insert the head in the work piece, means automatically operable to cause a lateral shifting movement between the parts whereby a first surface inaccessible by movement along said path may be machined, and a tripping mechanism to reverse said last-named means to reposition the parts for a continued movement along said first-named path to machine a second surface on said work piece.

3. In a machine for finished spaced internal surfaces on a work piece, of a milling head having individual cutters for the different surfaces, power operable means for inserting the head in the work piece, a second power operable means for successively positioning individual cutters in the plane of the surfaces to be finished, and trip operable means for causing said first-named power operable means to feed the cutters along their respective cutting paths.

4. A milling machine having a reciprocating table, a tool carrier movable toward and from the table, fluid operable means for shifting the tool carrier including a reversing valve, a plurality of dogs carried by the table for intermittently operating said valve to cause movement of the carrier away from the table and toward the table, and means to cause a reciprocation of the table after each of said movements to effect sequential machining of spaced surfaces on a work piece.

5. A milling machine having a reciprocating table, a plurality of tool carriers movable relative to the table, fluid operable means for shifting the tool carriers including a reversing valve, a plurality of dogs carried by the table for intermittently operating said valve to cause movement of the carriers to a first position and to a second position relative to the table, fluid operable means for effecting a single reciprocation of the table at a time, and means operable by the carriers to initiate a reciprocatory movement of the table at the end of each of said carrier movements.

6. A milling machine having a reciprocating table, a plurality of tool carriers movable relative to the table, fluid operable means for shifting the tool carriers including a reversing valve, a plurality of dogs carried by the table for intermittently operating said valve to cause movement of the carriers to a first position and to a second position relative to the table, fluid operable means for effecting a single reciprocation of the table at a time, means operable by the carriers to initiate a reciprocatory movement of the table at the end of each of said carrier movements, and a manual control effective on said last-named fluid operable means for shifting the table to a loading position.

7. A milling machine having a reciprocable table, a tool carrier, a source of pressure, a fluid operable device for shifting the carrier relative to the table from one of two positions to the other, fluid operable means for reciprocating the table on a feeding stroke and a rapid return stroke after each shifting movement of the carrier, means to stop the table after each reciprocation thereof, and manually controlled means for causing continued movement of the table along one of said paths to a loading position.

8. A milling machine having a plurality of slides, hydraulic means for actuating said slides alternately, manual means for initiating hydraulic movement of one of said slides to position a cutter internally of a work piece, control means subsequently operated by the moving slide for terminating its own movement and initiating movement of a second slide, and additional control means operable by the second slide at the completion of a stroke thereof to initiate a reciprocatory movement of the first slide, and means operable at the end of said reciprocatory movement to cause return movement of the first slide and initiate a second reciprocatory movement of the second slide.

9. In a milling machine having a plurality of tool carriers, internal milling heads attached to each of said carriers, a work table having means for supporting a work piece in line with each of said tool heads, means for effecting relative movement between the parts to insert the tool heads in respective work pieces, fluid operable means for reciprocating the carriers, means for causing a dwell at the end of each stroke of the carriers, and means trip operable by the carriers at the end of each stroke thereof to initiate a reciprocation of the table to effect a milling operation on each work piece.

10. In a milling machine, the combination with a tool slide and a work slide, an hydraulic circuit including a stop valve for controlling movement of the work slide, an hydraulic circuit including a reversing valve for controlling movement of the tool slide, means trip operable by the work slide for shifting said valves substantially simultaneously to cause the work slide to stop and the tool slide to start, a positive stop for limiting movement of the tool slide, and means responsive to the higher pressure created in the last named circuit by stoppage of the tool slide for shifting said stop valve to a running position.

11. In a milling machine having a work slide and a tool slide, the combination of fluid operable means for moving the work slide including a fluid circuit having a stop control valve therein, fluid operable means for moving the tool slide including a second fluid circuit having a reversing control valve therein, means operable by each slide for actuating the control valve of the other slide, one of said means including a fluid operable piston which is movable in opposite directions, and means uni-directionally moved thereby for shifting said control valve in only one direction.

12. In a machine tool having a tool slide and a work slide, a fluid operable control circuit for one of said slides including a stop valve, a latch pawl for holding said stop valve in its stop position, means to cause intermittent operation of said tool slide, first in one direction and then in another, a pair of fluid channels alternately connectible to pressure for reciprocating the tool slide, and means connected to said channels and responsive to high pressure created in said channels due to stoppage of the tool slide by a positive stop for releasing said latch means.

13. In a machine tool having a tool slide and a work slide, the combination of a control circuit for the work slide including a stop valve and a member uni-directionally movable for releasing said stop valve, a tool slide, fluid operable means for shifting said tool slide, including a fluid operable motor and a pair of channels connected thereto, control means for causing alternate strokes of said tool slide, positive stops for limiting the movement of the tool slide in each direction, a piston and cylinder, the opposite ends of the latter being connected to the respective channels whereby upon stoppage of said tool slide the piston will be moved in opposite directions, and means operable by said piston for actuating said uni-directionally movable member at the end of each stroke of the tool slide and regardless of the direction of movement of said piston.

WALTER HOIER.